March 27, 1934.  O. L. HOWLAND ET AL  1,952,499
MACHINE FOR COATING WELDING RODS AND THE LIKE
Filed Nov. 24, 1930  4 Sheets-Sheet 1
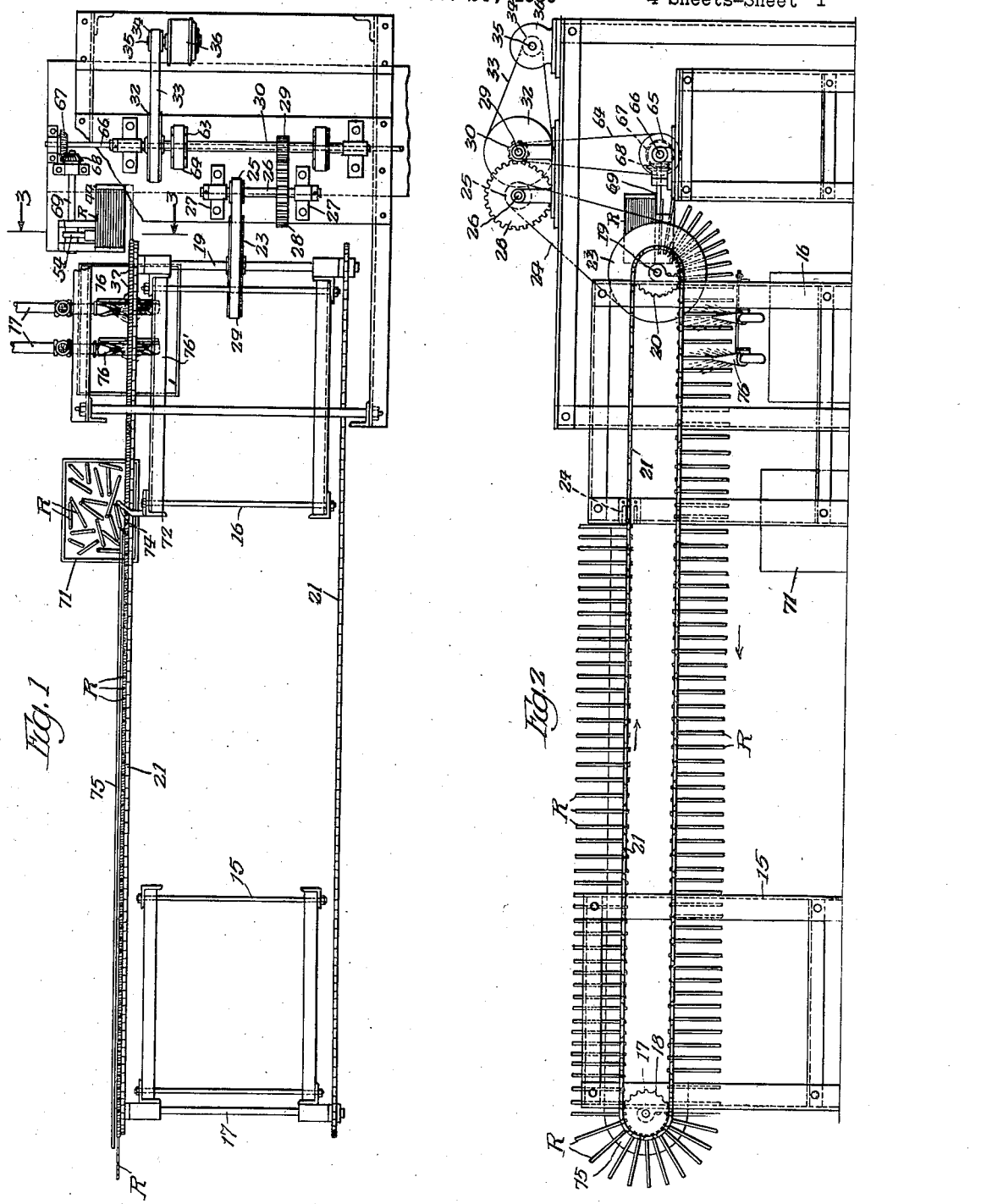
Inventors:
Owen L. Howland
Charles J. Kotchi
By [signature] Atty.

March 27, 1934.  O. L. HOWLAND ET AL  1,952,499
MACHINE FOR COATING WELDING RODS AND THE LIKE
Filed Nov. 24, 1930  4 Sheets-Sheet 2
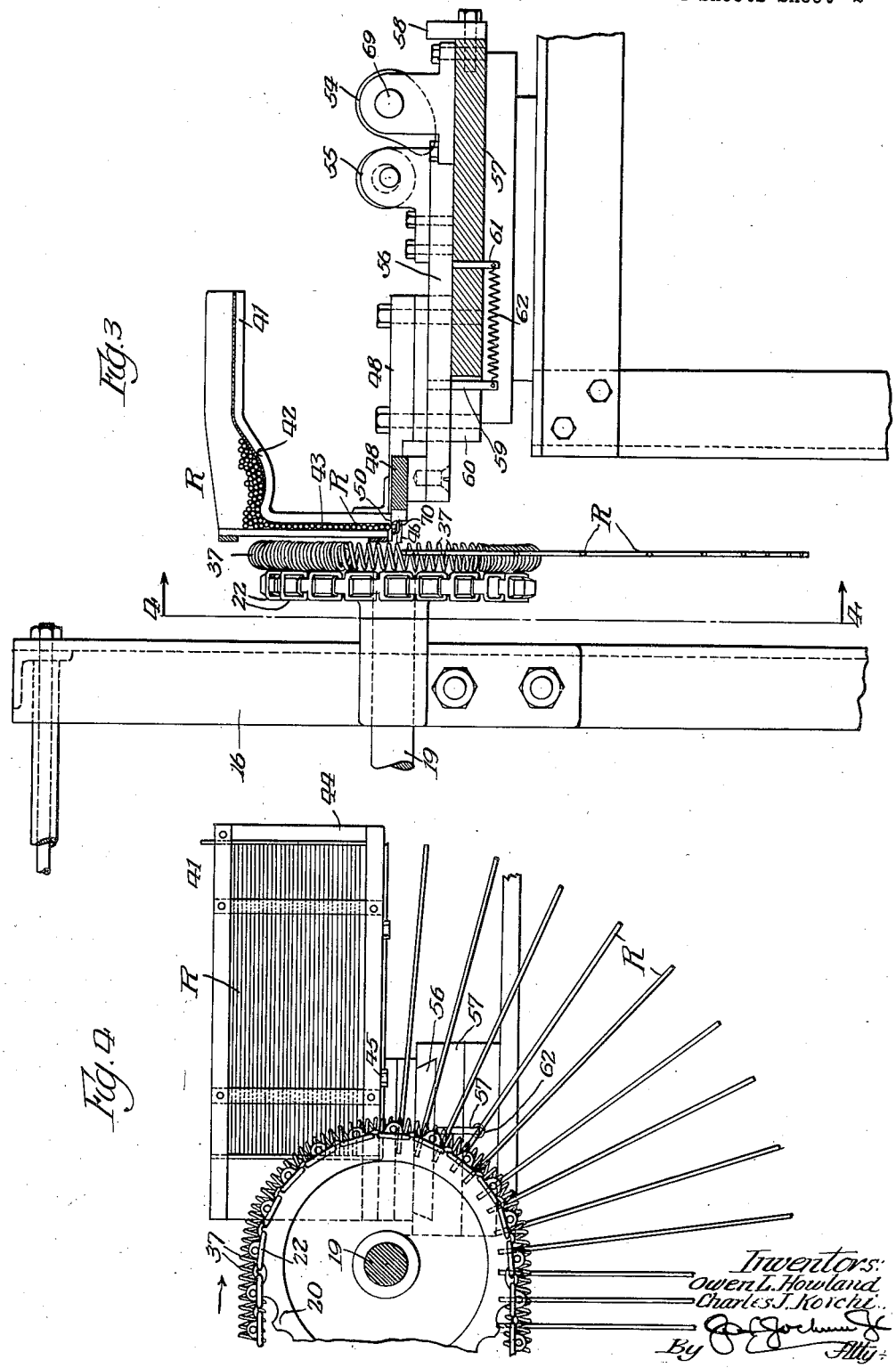

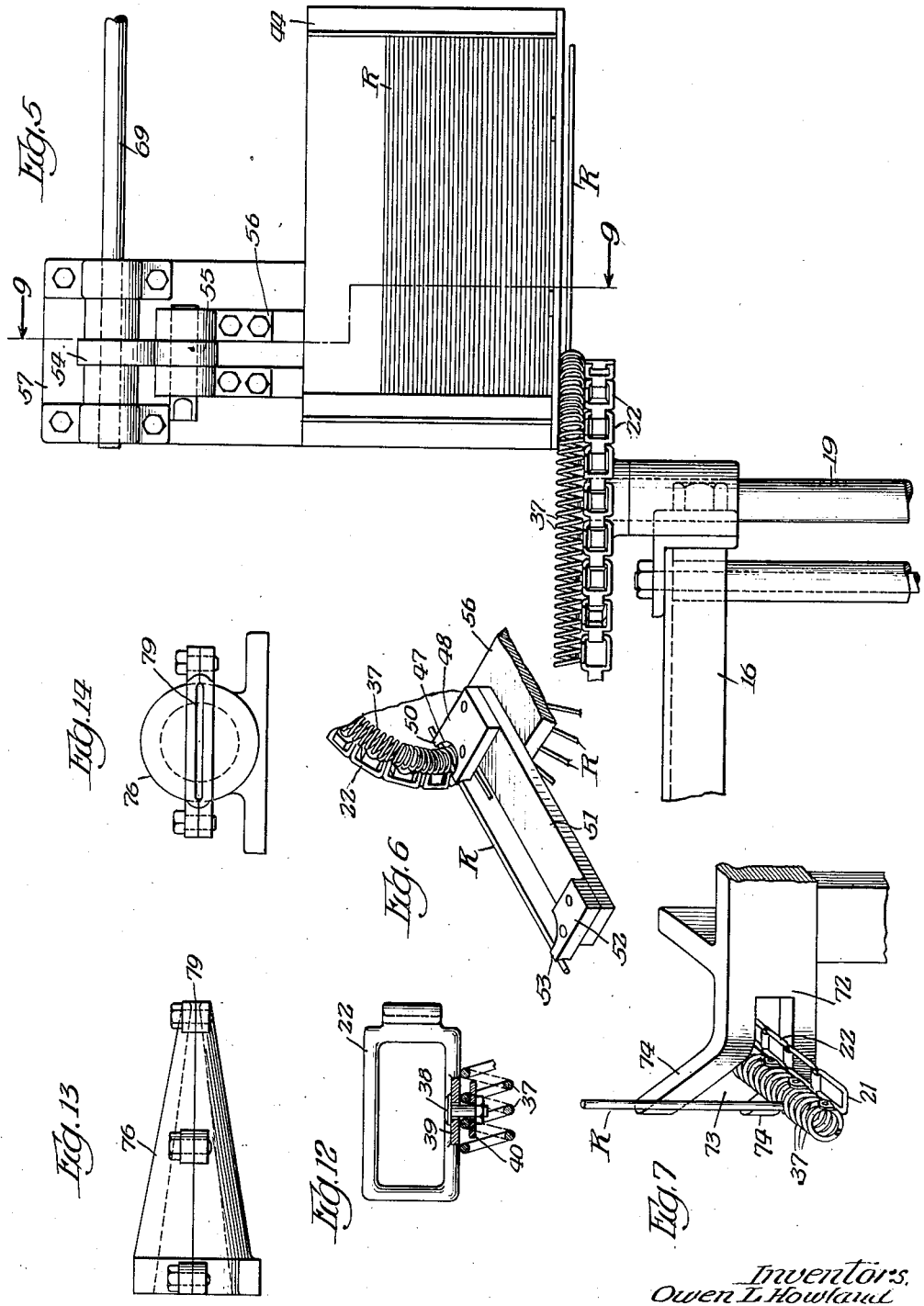

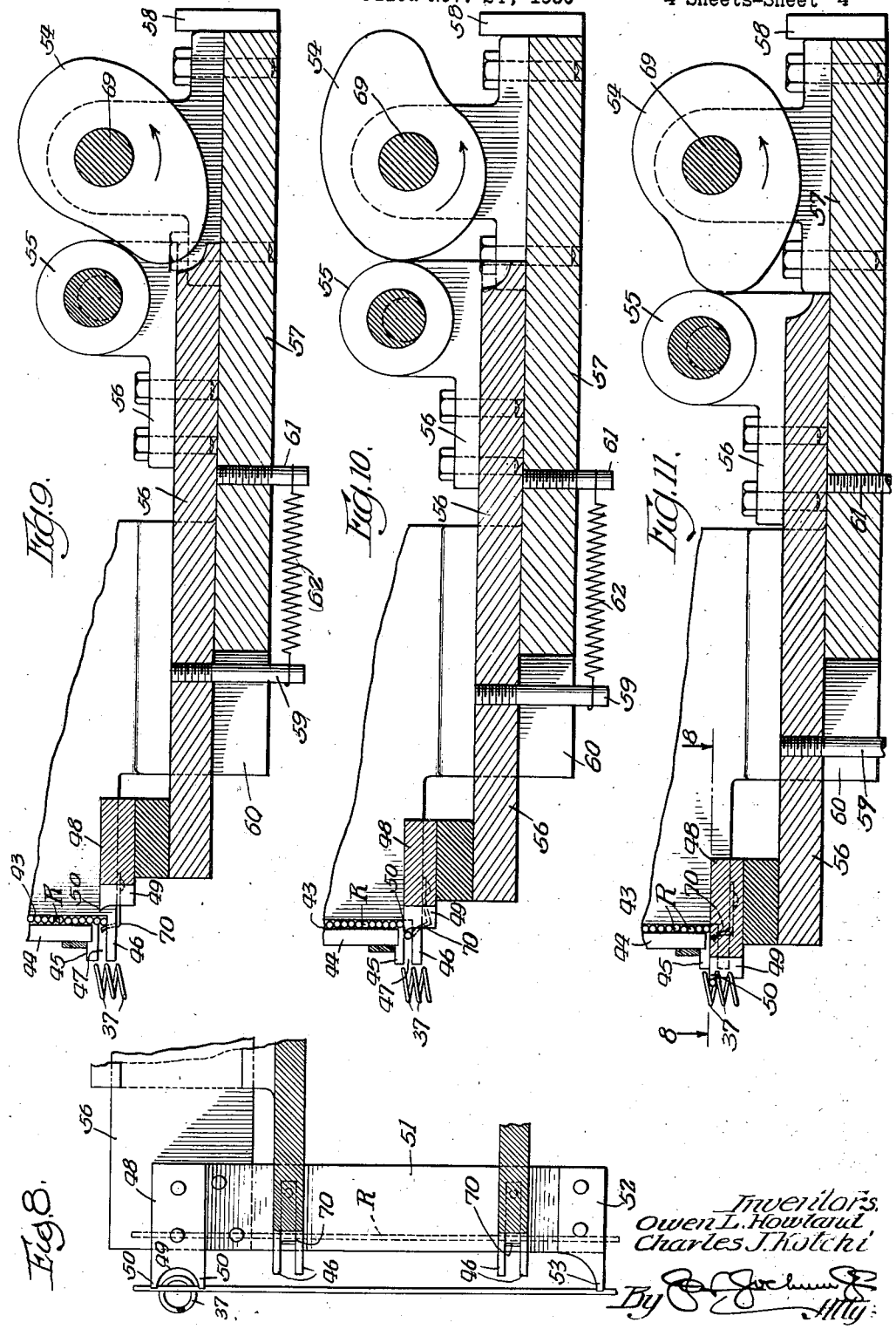

Patented Mar. 27, 1934

1,952,499

UNITED STATES PATENT OFFICE 1,952,499

MACHINE FOR COATING WELDING RODS AND THE LIKE

Owen L. Howland, Maywood, and Charles J. Kotchi, Chicago, Ill., assignors, by mesne assignments, to Una Welding Inc., Cleveland, Ohio, a corporation of Delaware Application November 24, 1930, Serial No. 497,712

13 Claims. (Cl. 198—179)

This invention relates to machines for coating welding rods and the like, and one of the objects of the invention is to provide an improved machine of this character for expeditiously handling and applying a coating thereto.

A further object is to provide in a machine of this character a conveyor for the rods and to which conveyor an end of the rod is attached to be advanced thereby, and improved means for applying the coating to the rod as it is advanced, and which rods will be conveyed to a delivery station at which they will be automatically disconnected from the conveyor and deposited in a suitable receptacle provided for the purpose.

A further object is to provide improved means for securing the rods to the conveyor by one end so that they will depend from the conveyor during a portion of the time that they are being advanced and also while the coating is being applied thereto, so as not to interfere with the surface of the coating, the end of the rod held by the conveyor being maintained bare to insure a good contact when the coated rod is applied in the welding machine.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a top plan view with parts omitted, of a machine of this character constructed in accordance with the principles of this invention.

Figure 2 is a side elevation of Figure 1.

Figure 3 is an enlarged detail view, partly in elevation, partly in section of the receiving end of the machine, showing the hopper for the rods and the manner of inserting or attaching them to the conveyor.

Figure 4 is a sectional view taken on line 4—4, Figure 3.

Figure 5 is a top plan view of a portion of the machine, similar to Figure 1, on an enlarged scale.

Figure 6 is a detail perspective view of the plunger for attaching the rods to the conveyor.

Figure 7 is a detail perspective view of the ejecting or delivering mechanism.

Figure 8 is a sectional view taken on line 8—8, Figure 11.

Figures 9, 10 and 11 are detail sectional views taken on line 9—9, Figure 5, on an enlarged scale, showing the parts in different positions.

Figure 12 is a view partly in horizontal section and partly in top plan of one of the links of the conveyor and a portion of the rod holding means showing the manner of securing the latter to the links.

Figure 13 is a side view of the nozzle for delivering the coating to the wire.

Figure 14 is an end elevation of Figure 13.

Referring more particularly to the drawings the numerals 15 and 16 designate suitable supporting structures of any desired height and spaced from each other for any desired distance.

Upon the structure 15 is journaled a shaft 17 which is mounted in suitable bearings and connected to the shaft is a sprocket wheel 18. A similar shaft 19 is journaled in suitable bearings upon the structure 16 and connected to the shaft 19 is a sprocket wheel 20. An endless conveyor preferably in the form of a sprocket chain 21 comprising links 22 passes over the sprocket wheels 18 and 20 and this conveyor 21 receives its motion from any suitable driving mechanism such as a pulley 23 secured to the shaft 19 and over which a belt 24 passes. This belt also passes over a pulley 25 secured to a shaft 26 journaled in suitable bearings 27 and connected with the shaft 26 for rotation therewith is a gear wheel 28 which meshes with a gear wheel 29 secured to a shaft 30 journaled in suitable bearings, and connected with the shaft 30 is a pulley 32 over which an endless belt 33 passes and which belt in turn passes over a pulley 34 secured to the shaft 35 of a motor 36.

Secured to the conveyor 21 is an endless flexible member, in the shape of a coiled spring, the convolutions 37 of which are spaced from each other and are resilient. This spring constitutes the holding member for the wire rods while they are being advanced by the conveyor and the holding member is secured to the links 22 in any desired or suitable manner preferably by means of a fastening bolt 38 which passes through an opening in an ear 39 secured to the link and also through a washer 40, the latter being arranged within the coil and extending across the space between adjacent convolutions, as shown more clearly in detail in Figure 12.

The holding member is secured to the side of the links of the endless conveyor so that it will be out of contact with the sprockets 18—20 as the conveyor is advanced.

Arranged adjacent one end of the conveyor is a hopper 41 which is preferably provided in the bottom thereof with a depressed portion 42 and the hopper terminates in an upright chute 43, the front wall 44 of which terminates short of the lower end of the rear wall of the chute and the bottom 45 of the wall 44 is shaped to form a forwardly projecting lip while the lower end of the rear wall of the chute is shaped to form a forwardly projecting lip 46 spaced below the lip 45 to form an open space 47 adjacent which the holding member comprising the coils 37 is adapted to travel, as shown more clearly in Figures 9, 10 and 11.

Arranged adjacent the bottom of the chute 43 is an ejector 48 which is preferably bifurcated at its forward end as at 49 to form lips 50, and the bifurcation 49 is so shaped that a portion of the coils 37 will extend thereinto when the ejector is moved forwardly.

Carried by the ejector 48 is an extension 51 having a projection 52 secured thereto and extending forwardly to provide a lip 53 which is in alinement with the lips 50 and is adapted to engage the wire or rod R at spaced points to insure the proper delivery of the rod from the chute.

The ejector 48 together with the extension 51 and projection 52 is adapted to be reciprocated in any desired or suitable manner but preferably by means of a cam 54 which is adapted to engage an anti-friction roller 55 mounted upon a slide 56 to which the ejector 48 is secured.

The slide 56 moves upon a guideway 57, a stop 58 being provided to limit the movement of the slide 56 in one direction.

Secured to the slide 56 and depending therefrom is an arm or extension 59 which passes through a slot 60 in the guide 57. A depending projection 61 is secured to the guide 57 and a coiled spring 62 is secured by one end to the projection 61 and by its other end to the projection 59. This spring 62 tends normally to retract the slide 56 with the ejector, but when the cam 54 is rotated and the slide 56 and ejector 48 are advanced, energy will be stored in the spring 62 to return the slide and the ejector.

The cam 54 is rotated preferably from the shaft 30 through the medium of a pulley 63, over which an endless belt 64 passes, and this belt in turn passes over a pulley 65 secured to a shaft 66. To this shaft 66 (see particularly Figures 1 and 2) is connected a gear 67 which meshes with a gear 68 that is secured to a shaft 69 and to the shaft 69 the cam 54 is secured.

Thus it will be seen that all of the parts are driven from the motor 36 and they are so connected that they will operate in timed relation with respect to each other.

The delivery end of the chute 43 is located adjacent one extremity of the endless conveyor and the holding member and as the ejector 47 is advanced, the lips 50 as well as the lip 53 on the projection 52 will engage the lowermost rod R which rests upon the projection 46 of the rear wall of the chute (see Figures 8, 9, 10 and 11) and will force the lowermost rod forwardly through the space 47 and cause one end of the rod to be forced between adjacent convolutions of the holding member to be frictionally held in position. The stress of these coils is such that the rods R will not drop from the conveyor but will be firmly attached thereto and will depend therefrom during the advancement of the conveyor for a portion of their travel and will pass around the sprockets and will be held uprightly during the remaining portion of their travel while they are connected with the conveyor.

A spring 70 is provided adjacent the bottom of the chute 43 to maintain the rods in position but will yield to permit the rods to be advanced.

After one of the rods has been thus attached to the holding member, the ejector 48 will be retracted by the spring 62, during which time the rods in the chute will fall to position another rod to be ejected upon the next operation of the chute.

As the ejector 48 is being retracted, the conveyor 21 will be advanced so as to position another portion of the holding member adjacent the space 47 to receive another rod.

The rods will thus be advanced by the endless conveyor until they arrive at a delivery station at which point is arranged a receptacle 71, into which the rods will fall and will be directed thereinto by a suitable chute, not shown, as they are ejected or disconnected from the conveyor.

Any suitable means may be provided for disconnecting the rods from the conveyor or holding member, but a simple and efficient means embodies an arm 72 secured to a suitable support and provided with a bifurcated portion 73 forming fingers 64 which are preferably inclined in the direction of the advancing movement of the conveyor.

As the rods are advanced and are held uprightly upon the upper run of the conveyor, they will as they are advancing to the delivery station engage the fingers 74, which latter will strip or disconnect them from the holding member, causing them to drop into the receptacle 71, the links of the conveyor as well as the holding member 37 will pass through the bifurcation 73.

It will therefore be manifest that the ejector 48 will remove the rods separately from the bottom of the chute 43 and attach them to the holding member 37 where they will be frictionally held by one end. The rods will then be advanced and will be prevented from falling over sidewise as they pass from the lower to the upper run of the conveyor by means of a suitable guide 75, until they arrive at the delivery station, where they will be ejected by the fingers 74 and will then fall or be delivered into the receptacle 71.

By the provision of the depression 42 in the bottom of the hopper 41 the rods will be properly positioned so that they will fall into the chute 43. If desired, the bottom of the hopper 41 may be inclined so as to cause the rods to advance by gravity or any suitable means may be provided for insuring the proper feeding of the rods to the chute (not shown).

At a predetermined time during the travel of the rods after they are connected to the conveyor, they will pass between opposed pairs of nozzles 76 and to which nozzles, through suitable pipes 77, is supplied a coating material, preferably under pressure. The nozzle will direct and deliver the coating upon the surface of the rods and beneath the nozzles is arranged a suitable tank. The nozzles are preferably provided with a narrow and extended outlet opening 79 so that the coating will be delivered in a fine ribbon like spray.

The conveyor 21 together with the holding member comprising the convolutions 37 are of such a length that after the rods have received the coating from the nozzle 76 and by the time they reach the delivery station to be ejected by the fingers 74, the coating will become completely dry.

The diameter of the convolutions 37 of the holding member is such that they will firmly grip and hold the rod, and the convolutions are so arranged as well as the chute 43 and the ejector 48, that the convolutions will engage the wire a sufficient distance from one end thereof to insure a proper and secure holding of the same, the portions of the rods which are engaged by the convolutions and from such point of engagement to the adjacent extremity of the rods, is bare so as to insure a proper contact of the rod when the same is inserted in the holder of the welding machine.

In the form of the invention shown in Figure 1 and while there is disclosed only one of the holding members as well as one hopper and ejector therefor, with one set of spraying or coating nozzles, it is to be understood that similar parts may be arranged adjacent the other endless conveyor 21 which is shown in Figure 1.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In a machine for treating wire rods and the like embodying a holder for the rods, a conveyor movable adjacent said holder, means for laterally ejecting the rods from said holder, means carried with the conveyor for gripping and holding the rods by one end only as they are laterally delivered thereto from the holder whereby substantially the entire length of the rod will be exposed for treatment as the rods are advanced by the conveyor, and means arranged in the path of movement of the rods with the conveyor for engaging and forcing the rods from the said gripping means.

2. In a machine for treating wire rods and the like, a container for a supply of rods, an endless conveyor, a portion of which moves adjacent said container, spring holders carried with the conveyor, said conveyor being so arranged that during the travel thereof, the said holders will move adjacent one end of the rods in the container, means for delivering the rods successively from the container and for laterally forcing one end thereof into the respective spring holders whereby the rods will be held by one end only and substantially the entire length of the rods will be exposed for treatment as they are advanced by the conveyor, and means arranged within the path of advancing movement of the rods with the conveyor to be engaged by the rods whereby the rods will be forced out of their respective holders.

3. In a machine for treating wire rods and the like, a container for a supply of rods, an endless conveyor, a portion of which moves adjacent said container, spring holders carried with the conveyor, said conveyor being so arranged that during the travel thereof the said holders will move adjacent one end of the rods in the container, means for delivering the rods successively from the container and for laterally forcing one end thereof into the respective spring holders whereby the rods will be held by one end only and substantially the entire length of the rods will be exposed for treatment as the rods are advanced by the conveyor, and means arranged within the path of travel of the rods with the conveyor to be engaged by the rods, whereby the rods will be disconnected from the conveyor.

4. In a machine for treating wire rods and the like, a supply holder for the rods, said holder having a delivery outlet, an endless conveyor, a portion of which moves adjacent said outlet, spaced co-operating resilient elements carried by the conveyor and between which one end of the rods are adapted to be forced, an ejector operable adjacent said outlet for successively and laterally ejecting the rods from the supply holder and for laterally forcing one end of each rod between respective co-operating elements whereby the rods will be connected to the conveyor by one end only to depend therefrom for a portion of the travel of the conveyor whereby substantially the entire length of the rods will be exposed for treatment as they are advanced by the conveyor, means for reciprocating the ejector, and means in the path of movement of the rods with the conveyor for engaging and laterally deflecting said rods to disengage them from said elements.

5. In a machine for treating wire rods and the like, an endless conveyor, means for operating the conveyor, a coiled spring secured to said conveyor and comprising convolutions spaced from each other, the axes of the convolutions being transverse to the line of travel of the conveyor, a holder for a supply of rods having a delivery outlet adjacent the path of movement of said spring, an ejector, and means for reciprocating the ejector, said ejector operating to individually remove the rods from the supply and force one end thereof between adjacent convolutions whereby the rods will be frictionally secured to the conveyor by one end.

6. In a machine for treating wire rods and the like an endless conveyor, means for operating the conveyor, a coiled spring secured to said conveyor and comprising convolutions spaced from each other, the axes of the convolutions being transverse to the line of travel of the conveyor, a holder for a supply of rods having a delivery outlet adjacent the path of movement of said spring, an ejector, means for reciprocating the ejector, said ejector operating to individually remove the rods from the supply and force one end thereof between adjacent convolutions whereby the rods will be frictionally secured to the conveyor by one end, and means for maintaining the rods against lateral tipping movement with respect to the conveyor.

7. In a machine for treating wire rods and the like, an endless conveyor, means for operating the conveyor, a coiled spring secured to said conveyor and comprising convolutions spaced from each other, the axes of the convolutions being transverse to the line of travel of the conveyor, a holder for a supply of rods having a delivery outlet adjacent the path of movement of said spring, an ejector, means for reciprocating the ejector, said ejector operating to individually remove the rods from the supply and force one end thereof between adjacent convolutions whereby the rods will be frictionally secured to the conveyor by one end, and means for forcing the said end of the rods from between said convolutions to disconnect the rods from the conveyor.

8. In a machine for treating wire rods and the like, an endless conveyor, means for operating the conveyor, a coiled spring secured to said conveyor and comprising convolutions spaced from each other, the axes of the convolutions being transverse to the line of travel of the conveyor, a holder for a supply of rods having a delivery outlet adjacent the path of movement of said spring, an ejector, means for reciprocating the ejector, said ejector operating to individually remove the rods from the supply and force one end thereof between adjacent convolutions whereby the rods will be frictionally secured to the conveyor by one end, and a stationary ejector for forcing the said end of the rods from between said convolutions to disconnect the rods from the conveyor and against which last said ejector the rods are moved by the advancement of the conveyor.

9. In a machine for treating wire rods and the like, an endless conveyor, means for operating the conveyor, a coiled spring secured to said conveyor and comprising convolutions spaced from each other, the axes of the convolutions being transverse to the line of travel of the conveyor, a holder for a supply of rods having a delivery outlet adjacent the path of movement of said spring, an ejector, means for reciprocating the ejector, said ejector operating to individually remove the rods from the supply and force one end thereof between adjacent convolutions whereby the rods will be frictionally secured to the conveyor by one end, and a stationary ejector for forcing the said end of the rods from between said convolutions to disconnect the rods from the conveyor and against which last said ejector the rods are moved by the advancement of the conveyor, said stationary ejector being bifurcated and through which bifurcation said conveyor and said convolutions pass.

10. In a machine for treating wire rods and the like comprising means for holding a supply of rods, an endless conveyor, means for operating the conveyor, means for successively and laterally ejecting the rods from the holder into the conveyor, the last said means embodying a reciprocable ejector engaging the rod in proximity to both ends thereof, means for temporarily securing the rods by one end to the conveyor, and means for disconnecting the rods from the conveyor.

11. A machine for treating iron rods and the like, comprising a container for holding a supply of rods having a delivery outlet and through which outlet the rods are laterally delivered, a conveyor, means on the conveyor movable adjacent a portion of said outlet for gripping the rods, and means for ejecting the rods laterally from said container and for forcing a portion of the rod into said gripping means in a direction transverse to the direction of travel of the conveyor.

12. A machine for treating iron rods and the like, comprising a container for holding a supply of rods having a delivery outlet and through which outlet the rods are laterally delivered, a conveyor, means on the conveyor movable adjacent a portion of said outlet for gripping the rods, and means for ejecting the rods laterally from said container and for forcing a portion of the rod into said gripping means in a direction transverse to the direction of travel of the conveyor, the said ejecting means embodying an ejector engaging the rod in proximity to the both extremities thereof.

13. A machine for treating iron rods and the like, comprising a container for holding a supply of rods having a delivery outlet and through which outlet the rods are laterally delivered, a conveyor, means on the conveyor movable adjacent a portion of said outlet for gripping the rods, means for ejecting the rods laterally from said container and for forcing a portion of the rod into said gripping means in a direction transverse to the direction of travel of the conveyor, and means arranged within the path of movement of the rod with the conveyor for disconnecting the rod from said gripping means.

OWEN L. HOWLAND.
CHARLES J. KOTCHI.